United States Patent [19]

Locey et al.

[11] 4,160,799
[45] Jul. 10, 1979

[54] MAINTAINING PLANARITY IN POLYESTER FILM DURING UNIFORM TEMPERATURE HEAT RELAXATION

[75] Inventors: Mark M. Locey; William F. Gottermeier, both of Rochester, N.Y.

[73] Assignee: Eastman Kodak Company, Rochester, N.Y.

[21] Appl. No.: 897,826

[22] Filed: Apr. 19, 1978

Related U.S. Application Data

[63] Continuation-in-part of Ser. No. 727,745, Sep. 29, 1976, abandoned.

[51] Int. Cl.$^2$ ............................................ B29C 25/00
[52] U.S. Cl. ................................ 264/342 R; 264/230; 264/342 RE
[58] Field of Search ............ 264/230, 342 R, 342 RE

[56] References Cited

U.S. PATENT DOCUMENTS

| | | | |
|---|---|---|---|
| 2,275,347 | 3/1942 | Chaveh et al. | 264/342 R |
| 2,275,348 | 3/1942 | Chaveh et al. | 264/342 R |
| 2,689,196 | 9/1954 | Daniels | 264/342 R |
| 3,632,726 | 1/1972 | Knox et al. | 264/230 |

FOREIGN PATENT DOCUMENTS

858154  1/1961  United Kingdom ..................... 264/230

*Primary Examiner*—Jay H. Woo
*Attorney, Agent, or Firm*—T. N. Dahl

[57] ABSTRACT

Biaxially-oriented, heatset polyester film is heat relaxed at a uniform temperature and supported buy impingement with gas such as air, while subjecting the film to low tension in its longitudinal dimension. Undesirable draw lines, as defined herein, are avoided by maintaining the longitudinal dimension of the film in an arcuate configuration composed of a single curve or serpentine succession of curves free of straight segments. Each such curve is characterized as having a radius of curvature in the range from about 1 inch to about 8 inches, subtending an arc of no less than 40°. A serpentine configuration is preferred in which case the gas impinges upon alternate sides of the web. Temperatures of heat relaxation preferably are within the range from 30 to 100 centrigrade degrees higher than the polyester glass transition temperature.

8 Claims, 3 Drawing Figures

MAINTAINING PLANARITY IN POLYESTER FILM DURING UNIFORM TEMPERATURE HEAT RELAXATION

This is a continuation-in-part of U.S. Patent Application Ser. No. 727,745, now abandoned entitled MAINTAINING PLANARITY IN POLYESTER FILM DURING HEAT RELAXATION by Mark M. Locey and William F. Gottermeier filed Sept. 29, 1976.

BACKGROUND OF THE INVENTION

1. Field of the Invention

This invention relates to maintaining the planarity of biaxially-oriented heatset polyester films. More specifically, the invention relates to simultaneously heat relaxing such films at a uniform temperature and supporting or buoying them by impingement with gas.

2. Prior Art

The commercial use of polyester films, such as polyethylene terephthalate films, is commonplace. In a typical preparation, a melt of polyester is extruded onto a cooling surface, and then stretched lengthwise and transversely (biaxial orientation). The degree of stretch or orientation is "locked-in" by heatsetting, which subjects the film to high temperatures and restraint in the transverse and length directions. This increases the crystallinity of the polyester. As an indication of increased crystallinity, one practicing heatsetting typically controls the degree of heating by monitoring film density. Crystallinity, in this regard, is generally understood to be linearly related to film density (typically expressed in gms/cc). In the case of polyethylene terephthalate, optimum heatset density is in the range from about 1.385 to about 1.395 gms/cc.

Biaxially-oriented polyester films, although heatset, retain a memory of their unstretched state. Without further treatment they will shrink if later employed at high temperatures. This can be avoided by heat relaxing or preshrinking the film at temperatures below those where heatsetting occurred, and by simultaneously allowing the film to shrink (relax) in at least one of the stretched dimensions.

It is generally recognized that heat relaxation can be enhanced by subjecting a film to minimum lengthwise tension on cushions of gas. The objective, in this regard, is to provide for least resistance to shrinkage of the film. This will also avoid damage to the film, as the shrinking of the film in contact with hot rollers can create film surface imperfections. See British Pat. No. 858,154 (published Jan. 11, 1961 and issued to Societe D'Applications Industrielles Plastiques); and U.S. Pat. No. 3,632,726 (issued Jan. 4, 1972 to K. L. Knox et al).

In the photographic industry, flatness, or planarity, is often essential in films which have been subjected to stretching and heat treating as described above. The defects that are associated with lack of planarity are numerous. In particular, the invention as described hereinafter provides for the reduction of so-called "drawline" planarity defects. Drawlines consist generally of parallel ridges and valleys extending in the longitudinal direction of the web and uniformly repeating as one views a transverse cross section of the web. They occur predominantly in biaxially-oriented heatset polyester films as a consequence of heat relaxing in a particular manner. Specifically, when these films are buoyed by gas in an environment of uniform temperature, in a flat or gently curved configuration, as described in the aforementioned British Pat. No. 858,154, while under low tension in the film longitudinal dimension, drawlines appear. In addition, drawlines seem to be more severe at higher heat relaxation temperatures, particularly from 30 to 100 centigrade degrees above the glass transition temperature of the polyester under treatment.

U.S. Pat. No. 3,632,726 describes a method of eliminating planarity defects in polyester films. In particular, this patent discloses heat relaxation of polyester film and simultaneous buoying of the film away from solid surfaces on cushions of air. To remove defects the polyester film is heat relaxed in a nonuniform temperature gradient established between a heat source and heat sink. By impinging the film with gas from the heat sink side of the film, those areas of the film with defects are urged closer to the heat source and so are heated to a higher temperature. This differential heating eventually causes the defects to shrink toward and merge with the remainder of the film. In contrast to the teachings of this patent, the invention described herein reduces planarity defects solely by controlling the film's geometry in a region of heat relaxation that is maintained at uniform temperature.

SUMMARY OF THE INVENTION

Biaxially-oriented heatset polyester film, having a thickness in the range from about 1 to about 7 mils, is heated at a uniform heat relaxation temperature and simultaneously impinged with gas so as to buoy, i.e. support, the film in an arcuate configuration and subjected to low tension in its longitudinal dimension. To avoid the occurrence of drawlines, the film configuration in its longitudinal dimension is composed of a single curve, or serpentine succession of curves, substantially free of straight segments. Each curve, moreover, has a radius of curvature in the range from about 1 inch to about 8 inches and subtends an arc of no less than 40 degrees. A serpentine succession of curves is preferred, and is provided by cushions of gas impinging upon alternate sides of the film.

In one embodiment of the invention, temperatures in the range from 30 to 100 centigrade degrees higher than the glass transition temperature of the polyester are employed to relax the film while it is maintained in the configuration described above. Severe drawline distortions, normally appearing in the film at such temperatures are substantially avoided.

BRIEF DESCRIPTION OF THE DRAWINGS

The invention will be described with reference to the drawings wherein.

DETAILED DESCRIPTION OF THE PREFERRED EMBODIMENTS

As previously noted, drawline distortions are prone to occur in biaxially-oriented, heatset, crystalline polyester film when subjected to a certain mode of heat relaxation at uniform temperature. In particular, buoying of such films on cushions of gas in a straight or gently curved configuration while subjecting the film to low tension in its longitudinal dimension at uniform temperatures of heat relaxation gives rise to drawlines.

Figure 1:
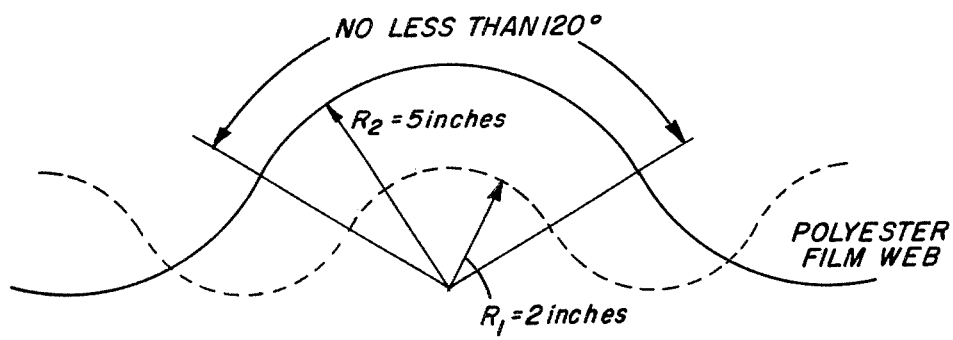
FIG. 1 is a cross-sectional view of longitudinal profiles of polyester films having configurations of the geometry specified in accordance with a preferred embodiment of the invention.

In accordance with the present invention, the occurrence of drawlines in gas-buoyed films can be avoided if the configuration extending in the longitudinal dimension of the film is constrained in a particular geometry within the heat relaxation region. Such configuration is non-linear and defined by one curve or a serpentine succession of curves, each curve having relatively severe curvature. Severe curvature is defined as a radius of curvature lying within the range from about 1 inch to about 8 inches. Each curve, in addition, must subtend an arc of no less than 40°. Preferably, as illustrated in FIG. 1, such arc is at least about 120° and the radius of curvature is in the range from about 2 to 5 inches. The upper limit of arc, as a rule, is set by the available spacing within the apparatus employed. That is, as one employs an arc of, say, 270°, the apparatus components and different segments of the moving web can become impractically close. Further increase in arc may cause interference of such components and web segments. Optimum results can be achieved when the arc is about 180°.

In addition to the above indicated radius of curvature and arc requirements, it is important that the film configuration within the heat relaxation region be substantially free of linearity, i.e., have essentially no straight spans. Drawlines, once they appear, are not readily removed even though the film be subsequently curved as indicated. Non-linearity is of particular concern when a serpentine configuration is employed. As is evident from a preferred embodiment as depicted in FIG. 1, in the transition from one curve to the next, the film reverses its direction of curvature. It has been shown, however, that drawlines will not appear provided the polyester film web is maintained continuously curved, i.e., non-linear, during transition.

As described herein, films that are particularly prone to having drawlines have a thickness ranging from about 1 to 7 mils. Films having greater than a 7 mil thickness are generally rigid enough so that the formation of drawlines is not encountered. Films of less than 1 mil thickness, while drawline prone, are extremely flimsy and difficult to handle. Four mil thick films are preferably treated by the method described herein.

In the practice of the invention, no tension is imparted to the film in its transverse dimension. In the longitudinal (or machine) dimension, however, low tension is applied to aid in handling and/or guiding the film, which tension, as previously noted, contributes to the appearance of drawlines. Simply removing longitudinal tension, however, is equally if not more undesirable as such removal can give rise within the heat relaxation region to random buckling of the film, film wandering, and film flutter. Excessive tension, on the other hand, can cause the film to undesirably contract (neck-in) transversely. Low tension, therefore, in the longitudinal dimension, as employed herein, is such tension greater than zero that does not contribute significantly to dimensional loss in the film's transverse dimension. What loss is experienced, should essentially be a result of thermal shrinkage during heat relaxation. When heat relaxing polyethylene terephthalate, a level of tension in the range from 5 to 100 psi is preferably employed. Most preferably, such tension is from about 10 to about 40 psi. When 4 mil (0.004 inch) thick polyethylene terephthalate film is heat relaxed, the preferred tension in the machine direction is about 25 psi. It should be understood, of course, that as films of different polyester materials, with correspondingly different stiffnesses, are heat relaxed, longitudinal tension employed may differ from that employed for polyethylene terephthalate.

To impart machine direction tension to the polyester films as described herein, tension isolating means are provided in line with and immediately adjacent both ends of the heat relaxation region. Such means may include a vacuum hug roll, a variable weighted float roll, and the like. It is important, however, that tension devices contact the film only when it is cool, that is, below the polyester Tg, so as to avoid damage to the film surface.

Polyester films which can be heat relaxed in accordance with the invention are those which have previously been biaxially stretched, and heatset to achieve enhanced crystallinity. The techniques and principles employed to biaxially stretch and heatset polyesters are well known. In general, stretching is carried out when the film is heated to temperatures above the glass transition temperature but below the melting temperature of the polymer. The heated film is stretched longitudinally about 2 to 3 times its original length, and then similarly stretched widthwise, or transversely. Stretching, moreover, affects some change in the crystallinity of the polymer. To enhance the crystallinity and to increase the dimensional stability of the stretched film, it is heatset by heating it near its crystallization point while maintaining its length and width dimensions constant.

Useful polyesters for the purpose of this invention include polymeric esters of a dicarboxylic acid and a dihydric alcohol, such as polyethylene terephthalate, polyethylene 2,6-naphthalene dicarboxylate and the like.

Treatment of a polyester film in accordance with the invention can be effected while the film is held motionless within the heat relaxation region. In general, however, it is preferred to treat a film web which is moving continuously over one or more cushions of air in the direction of its longitudinal dimension. With respect to a moving web, the configuration maintained is attributable to the path over which the film traverses through the heat relaxation region. That is, the curvature and arc requirements established above, are imposed on the film by means of the film's path of travel. For convenience, the ensuing descriptions and example are, for the most part, set forth within the context of a continuously moving web. It should be understood, of course, that the invention is not so limited.

Figure 2:
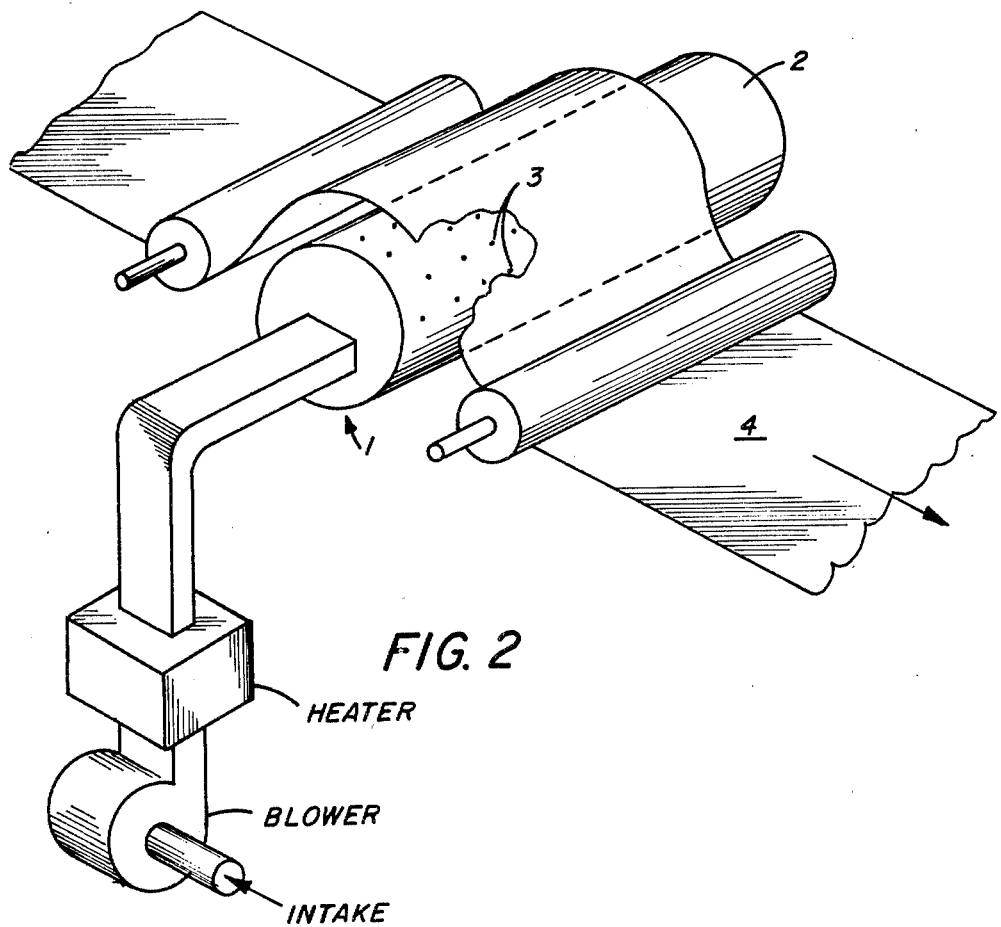
FIG. 2 is a perspective view of a heat relaxation region in which the longitudinal configuration of the film comprises one curve as described in accordance with one embodiment of the invention.

Within the heat relaxation region, a cushion of gas, such as air, impinges the moving web in such a manner as to keep the web out of contact with solid surfaces, along the path of desired curvature. Useful gases include air, nitrogen, argon and the like. A suitable apparatus for providing a gas cushion includes a so-called air-bar or air turning bar 1 (FIG. 2). As the name implies, air-bars most often employ air as the gaseous medium. Essentially, an air-bar 1 comprises a plenum with a curved outer surface 2 having a large number of holes or jets 3 designed to provide a cushion of air under a continuously moving film web 4 closely spaced from the air-bar surface 2. How tightly the jets are clustered, and the angle with which each air blast strikes the moving web affect the web's transverse profile within the heat relaxation region. Generally, a flat profile is preferred.

Figure 3:
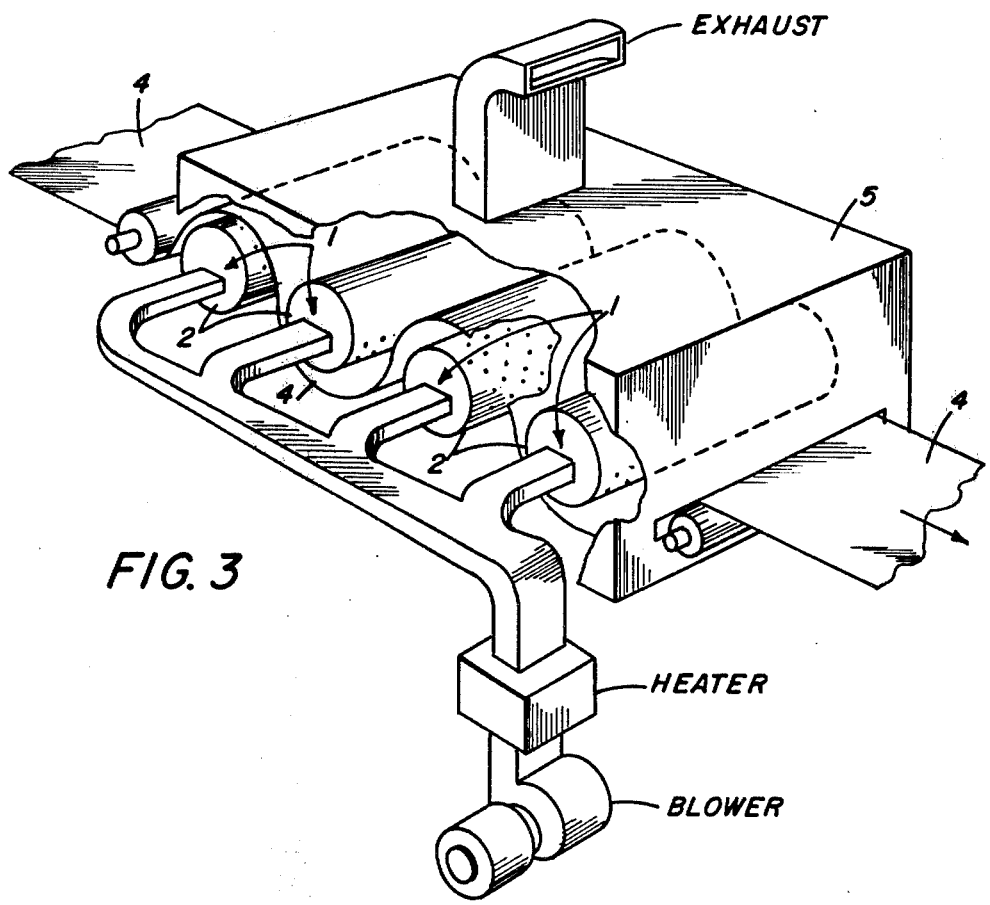
FIG. 3 is a perspective view of a heat relaxation region in which the longitudinal configuration of the film comprises a serpentine succession of curves as described in accordance with a preferred embodiment of the invention.

As indicated above, polyester films described herein can be maintained along a path of travel whose configuration is composed of more than one curve of the specified geometry, i.e., a serpentine path (FIG. 3). The use of a serpentine configuration permits increase of the effective overall length of the heat relaxation region and concomitantly an increase of heat relaxation capacity within that region compared to the heat relaxation capacity associated with a single-curve path of travel. Serpentine configuration is typically created by a succession of air-bars 1 which provide air cushions to impinge the moving polyester web 4 on alternate sides in such a manner as to produce characteristically serpentine crests and troughs.

Heat relaxation by the method described herein is carried out in an environment of uniform temperature, i.e., an environment that is substantially free of temperature gradients in the heat relaxation region (other than those that normally occur as a result of heat losses). Thus, film heat relaxed by the practice of this invention, substantially avoids drawlines as a consequence of geometry constraint rather than differential temperature treatment as described in the aforementioned Knox et al U.S. Pat. No. 3,632,726.

To obtain uniform temperature in the heat relaxation region the entire region can be insulated against heat loss by enclosure 5 such as shown in FIG. 3. The heat source for bringing the enclosed region to the desired uniform temperature can be established in the inlet duct for the air moving towards the air-bars. In the embodiment of FIG. 2, film enters one end, passes through along the curved—in this instance serpentine—path as specified herein, and exits through the opposite end of the enclosure 5. Heated air cushions are provided as indicated above. Air exhausting from the enclosure 5 can be recycled for reuse in the air turning bars 1.

In a preferred embodiment of the invention, high temperatures, such as from 30 to 100 centigrade degrees higher than the glass transition temperature of the polymer under treatment, are employed to heat relax the gas buoyed film. Though such temperatures are normally conducive of severe drawlines, practice of the invention employing such temperatures substantially avoids the defect. In the case of biaxially-oriented, heatset polyethylene terephthalate films, therefore, one can now heat relax at temperatures within the range from 130° C. to 200° C., most preferably from about 150° C. to about 200° C., and obtain substantially drawline-free product.

The time required to heat relax films in accordance with the invention, can vary from 1 second to about 10 minutes. Preferably, about a minute of heat relaxation is employed.

Further understanding of the invention can be obtained from the following example.

EXAMPLE 1

To examine the effects of curvature during heat relaxation as described herein, .4 mil thick biaxially-oriented, heatset polyethylene terephthalate film samples were treated in a simulated environment. Approximately 2 inch wide strips of the film were spanned lengthwise between two parallel rods, i.e., suspended by their ends on each rod, in a characteristic arc. The radius of curvature of the arc was varied by increasing or decreasing the length of film span between each rod. The rods and suspended film strips were placed in an oven and the oven heated to a uniform temperature of 120° C. for 30 minutes. The weight of each film strip provided low longitudinal tension; the support rods included slip bearings to permit widthwise relaxation of the film during treatment. After treatment, the films were cooled to room temperature and rated as either having (yes) or not having (no) significant distortion. Results are shown in Table I.

TABLE I

| Radius of Curvature | Arc Length (degrees) | Distortion |
| --- | --- | --- |
| 20 inches | 30° | Yes |
| 12 | 50° | Yes |
| 8 | 80° | No |
| 4 | 120° | No |
| 2 | 120° | No |
| 1 | 120° | No |

EXAMPLE 2

An apparatus for practicing the invention comprises an enclosure with six cylindrical air turning bars each of which has a 2 inch radius and an overall length slightly larger than 12 inches so as to permit heat relaxation of a 12 inch wide polyester web. The cylindrical axes of the respective air-bars are parallel, coplanar, and spaced so as to permit approximately 180° of film wrap. The surface of each turning bar over which polyester web will travel is provided with a plurality of jets of 0.08 inch diameter to deliver heated air from each air-bar. The air-bars are arranged to impinge heated air against alternate sides of the web so that the web assumes a non-linear serpentine or sinusoidal path through the heat relaxation region. FIG. 3 represents generally the apparatus employed in this example. Air enroute to the air-bars is heated by thermostatically controlled electric heaters having a total heating capacity of about 81,890 BTU. Air is passed through the heaters and to the air-bars at a static pressure of 2 to 5 inches of water by a centrifugal blower. After heat relaxing and conveying polyester film as described herein, the heated air is recirculated to the blower inlet. Duct dampers and a fresh air make-up damper allow for proper balancing of this closed loop uniform temperature heating system.

Polyethylene terephthalate film webs of 1.4, 2.85, 4.0 and 7.0 mil thickness respectively, have been treated in the above apparatus. These films were previously stretched at 93° C. lengthwise to 3.3 times their unstretched length and widthwise to 3.0 times their unstretched width, and thereafter heatset at 200° C. to a density of 1.39 gms/cc. Each film is passed in the above described manner through the heat relaxation oven at speeds varying from 10 to 50 feet of film per minute. Temperatures employed to heat relax range from 150° C. to 200° C. In each case heat relaxation is accomplished with substantial avoidance of drawlines. With regard to 4.0 mil film particularly good results can be achieved employing a film speed of 25 feet per minute.

By heat relaxing in accordance with the method described herein, polyester films can be obtained which are particularly useful in high temperature photographic processing. Thermally stable as well as drawline-free product is obtained. In this regard, the temperature to which films will later be subjected usually affects the selection of heat relaxation temperature. Generally, one heat relaxes at a uniform temperature slightly higher than the anticipated use temperature.

The invention has been described with particular reference to preferred embodiments. It will be understood, however, that modifications can be made within the spirit and scope of the invention in light of the foregoing disclosure and appended claims.

What is claimed is:

1. A method of heat relaxing a biaxially-oriented heatset polyester film having a thickness from about 1 mil to about 7 mils, said method comprising heating said film at a uniform temperature sufficient to heat relax the film, while simultaneously subjecting the film to low tension in its longitudinal dimension and impinging gas on the film so as to buoy the film in a curved configuration free of straight segments along said longitudinal dimension, said curved configuration having at least one curved segment defined by a radius of curvature within the range from about 1 inch to about 8 inches subtending an arc of no less than 40 degrees.

2. The method of claim 1 wherein said curved configuration is a single curved segment.

3. The method of claim 1 wherein said curved configuration is a serpentine succession of said curved segments.

4. The method of claim 3 wherein said temperature is in the range from about 30 to about 100 centigrade degrees higher than the glass transition temperature of said polyester film.

5. The method of claim 3 wherein said polyester film is polyethylene terephthalate.

6. The method of claim 4 wherein said radius of curvature is within the range from about 2 to about 5 inches and said arc is no less than about 120 degrees.

7. A method of heat relaxing a biaxially-oriented polyethylene terephthalate film having a thickness from about 1 mil to about 7 mils, said method comprising heating said film at a uniform temperature in the range from about 150° C. to about 200° C., while simultaneously subjecting the film to a tension in its longitudinal dimension in the range from about 5 psi to about 100 psi and impinging gas on the film so as to buoy the film in a curved configuration free of straight segments along said longitudinal dimension, said curved configuration comprising a serpentine succession of curved segments each defined by a radius of curvature in the range from about 2 to about 5 inches subtending an arc of no less than about 120°.

8. The method of claim 7 wherein said tension is in the range from about 10 psi to about 40 psi, said polyethylene terephthalate film has a density in the range from about 1.385 to about 1.395 gm/cc and a thickness of about 4.0 mils, and each of said curved segments has a radius of curvature of about 2 inches subtending an arc of about 180°.